US008909582B2

United States Patent
Eto et al.

(10) Patent No.: US 8,909,582 B2
(45) Date of Patent: Dec. 9, 2014

(54) HIERARCHICAL LATENT VARIABLE MODEL ESTIMATION DEVICE, HIERARCHICAL LATENT VARIABLE MODEL ESTIMATION METHOD, AND RECORDING MEDIUM

(71) Applicant: NEC Corporation, Tokyo (JP)

(72) Inventors: Riki Eto, Tokyo (JP); Ryohei Fujimaki, Tokyo (JP); Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 13/758,267

(22) Filed: Feb. 4, 2013

(65) Prior Publication Data
US 2014/0222741 A1 Aug. 7, 2014

(51) Int. Cl.
*G06N 5/02* (2006.01)
*G06N 7/00* (2006.01)

(52) U.S. Cl.
CPC *G06N 5/02* (2013.01); *G06N 7/005* (2013.01); *G06N 5/025* (2013.01)
USPC .............................................. 706/46; 706/45

(58) Field of Classification Search
None
See application file for complete search history.

(56) References Cited

U.S. PATENT DOCUMENTS

2012/0323834 A1 12/2012 Fujimaki
2013/0325782 A1 12/2013 Fujimaki et al.

OTHER PUBLICATIONS

Thiesson, et al., Fast Variational Mode-Seeking, Proceedings of the 15th International Conference on Artificial Intelligence and Statistics (AISTATS), 2012, vol. 22 of JMLR:W&CP 22, 2012, pp. 1230-1242.*
Lazaro-Gredilla, et al., Variational Heteroscedastic Gaussian Process Regression, Proceedings of the 28 th International Conference on Machine Learning, 2011, pp. 1-8.*
Christopher M. Bishop et al., "Bayesian Hierarchical Mixtures of Experts", Proceedings of the Nineteenth Conference on Uncertainty in Artificial Intelligence, 2002, pp. 57-64.
Christopher Bishop, "Pattern Recognition and Machine Learning", Springer, 2007, pp. 423-459.
Ryohei Fujimaki et al., "Factorized Asymptotic Bayesian Inference for Mixture Modeling", Proceedings of the Fifteenth International Conference on Artificial Intelligence and Statistics (AISTATS), Mar. 2012, pp. 400-408.
Jurgen Van Gael et al., "Beam Sampling for the Infinite Hidden Markov Model", Proceedings of the 25th International Conference on Machine Learning, 2008, 8pgs.
Matthew J. Beal, "Variational Algorithms for Approximate Bayesian Inference", PhD thesis, University College of London, May, 2003, 281 pgs.
EP Search Report issued Sep. 4, 2014 in PCT/JP2014/000038.
Jordan, Michael I., et al., "Hierarchical mixtures of experts and the EM algorithm", Department of Brain and Cgnitive Sciences, MIT, Cambridge, MA 02139, published Oct. 25, 1993. pp. 1339-1344.
Eto, Riko et al., "Fully-Automated Bayesian Piecewise Sparse Linear Moderls", NEC Corporation, Apr. 22, 2014, pp. 238-246.

* cited by examiner

*Primary Examiner* — Wilbert L Starks
(74) *Attorney, Agent, or Firm* — Sughrue Mion, PLLC

(57) ABSTRACT

A hierarchical latent structure setting unit 81 sets a hierarchical latent structure that is a structure in which latent variables are represented by a tree structure and components representing probability models are located at nodes of a lowest level of the tree structure. A variational probability computation unit 82 computes a variational probability of a path latent variable that is a latent variable included in a path linking a root node to a target node in the hierarchical latent structure. A component optimization unit 83 optimizes each of the components for the computed variational probability. A gating function optimization unit 84 optimizes a gating function model that is a model for determining a branch direction according to the multivariate data in a node of the hierarchical latent structure, on the basis of the variational probability of the latent variable in the node.

9 Claims, 12 Drawing Sheets

HIERARCHICAL LATENT VARIABLE MODEL ESTIMATION DEVICE, HIERARCHICAL LATENT VARIABLE MODEL ESTIMATION METHOD, AND RECORDING MEDIUM

BACKGROUND OF THE INVENTION

1. Field of the Invention

The present invention relates to a hierarchical latent variable model estimation device and a hierarchical latent variable model estimation method for estimating a hierarchical latent variable model for multivariate data, and a computer-readable recording medium having recorded thereon a program for estimating a hierarchical latent variable model for multivariate data.

2. Description of the Related Art

Data typified by sensor data acquired from a car, sales performance of a store, electricity demand history, and the like is data observed according to various factors and accumulated. For example, sensor data acquired from a car varies depending on driving mode. Thus, the data is accumulated as observation values resulting not from one factor but from various factors.

Analysis of factors from which such data results can be applied to industrially important situations. As an example, analyzing a cause of trouble of a car enables quick repair of the car. As another example, analyzing correlations between sales and weather and/or time of day enables reduction of stockout or overstock. As yet another example, recognizing an electricity demand pattern enables prevention of excess or shortage of electricity.

Moreover, if it is possible to analyze how switching between the plurality of factors is made, prediction can be performed by combining knowledge obtained for each factor. Besides, their switching rule can be used as knowledge for marketing, too. Such analysis is therefore applicable to more sophisticated situations.

To separate the above-mentioned data resulting from the plurality of factors on a factor-by-factor basis, a mixture latent variable model is typically used in modeling. As a model including the above-mentioned switching rule, a hierarchical latent variable model is proposed (for example, see Non Patent Literature (NPL) 1).

In order to use such a model, it is necessary to determine the number of hidden states, the type of observation probability distribution, and distribution parameters. In the case where the number of hidden states and the type of observation probability distribution are known, the parameters can be estimated through the use of, for example, an expectation maximization algorithm described in NPL 2. Hence, how to determine the number of hidden states and the type of observation probability distribution is important.

The problem of determining the number of hidden states and the type of observation probability is commonly referred to as a "model selection problem" or a "system identification problem", and is an extremely important problem for constructing a reliable model. Various methods for determining the number of hidden states and the type of observation probability are accordingly proposed.

As a method for determining the number of hidden states, for instance, there is proposed a method of maximizing variational free energy by a variational Bayesian method (for example, see NPL 3). As another method for determining the number of hidden states, there is proposed a nonparametric Bayesian method using a hierarchical Dirichlet process prior distribution (for example, see NPL 4).

Further, a method for determining the type of observation probability by approximating, for a mixture model which is a typical example of a latent variable model, a complete marginal likelihood function and maximizing its lower bound (lower limit) is described in NPL 5.

SUMMARY OF THE INVENTION

In the method of maximizing the variational free energy by the variational Bayesian method, the independence of hidden states and distribution parameters in variational distribution is assumed when maximizing the lower bound of the marginal likelihood function. This causes a problem of decreased marginal likelihood approximation accuracy.

As the nonparametric Bayesian method using the hierarchical Dirichlet process prior distribution, a Monte Carlo-based optimization algorithm is known. However, this algorithm has a problem of extremely high computational complexity.

It is practically impossible to determine the type of observation probability by these two methods, due to their problem of computational complexity. This problem of computational complexity is described below, using an example where the observation probability distribution is a mixture polynomial curve. Since the following discussion does not depend on hidden states, their description is omitted.

In the case where an observation for a hidden state is a polynomial curve, it is necessary to properly select the degree of the curve such as a linear curve (straight line), a quadratic curve, a cubic curve, or the like, in order to determine the type of observation probability. When using a typical method, an information criterion needs to be computed for all model candidates in such a manner that, for example, a straight line and two quadratic curves are adopted when the number of hidden states is 3, or three cubic curves and two quartic curves are adopted when the number of hidden states is 5.

However, the number of model candidates increases exponentially with the complexity of the model to be searched for. For instance, in the case where the number of hidden states is 10 and the maximum degree of the curve is 10, the number of candidates is about 100,000. In the case where the number of hidden states is 20 and the maximum degree of the curve is 20, the number of candidates is about several tens of billions. Thus, it is practically difficult to perform computation by a typical method.

The hierarchical latent variable model described in NPL 1 is a model estimated using the method of maximizing the variational free energy by the variational Bayesian method, where computation is practically difficult, too.

Even when the method described in NPL 5 is used, there is still a problem that the model selection problem for a model including hierarchical latent variables cannot be solved. This is because the method described in NPL 5 does not take hierarchical latent variables into account, and so is unable to evidently establish a computational procedure. Besides, since the method described in NPL 5 is based on a strong assumption that it is not applicable to the case where there are hierarchical latent variables, theoretical justification is lost if this method is simply applied.

In view of this, an exemplary object of the present invention is to provide a hierarchical latent variable model estimation device, a hierarchical latent variable model estimation method, and a computer-readable recording medium having recorded thereon a hierarchical latent variable model estimation program that can solve the model selection problem for a hierarchical latent variable model including hierarchical latent variables and also estimate the hierarchical latent variable model with appropriate computational complexity without losing theoretical justification.

An exemplary aspect of the present invention is a hierarchical latent variable model estimation device for estimating a hierarchical latent variable model for multivariate data, the hierarchical latent variable model estimation device including: a hierarchical latent structure setting unit for setting a hierarchical latent structure that is a structure in which latent variables are represented by a tree structure and components representing probability models are located at nodes of a lowest level of the tree structure; a variational probability computation unit for computing a variational probability of a path latent variable that is a latent variable included in a path linking a root node to a target node in the hierarchical latent structure; a component optimization unit for optimizing each of the components for the computed variational probability; and a gating function optimization unit for optimizing a gating function model that is a model for determining a branch direction according to the multivariate data in a node of the hierarchical latent structure, on the basis of the variational probability of the latent variable in the node.

An exemplary aspect of the present invention is a hierarchical latent variable model estimation method for estimating a hierarchical latent variable model for multivariate data, the hierarchical latent variable model estimation method including: setting a hierarchical latent structure that is a structure in which latent variables are represented by a tree structure and components representing probability models are located at nodes of a lowest level of the tree structure; computing a variational probability of a path latent variable that is a latent variable included in a path linking a root node to a target node in the hierarchical latent structure; optimizing each of the components for the computed variational probability; and optimizing a gating function model that is a model for determining a branch direction according to the multivariate data in a node of the hierarchical latent structure, on the basis of the variational probability of the latent variable in the node.

An exemplary aspect of the present invention is a computer-readable recording medium having recorded thereon a hierarchical latent variable model estimation program for estimating a hierarchical latent variable model for multivariate data, the hierarchical latent variable model estimation program causing a computer to execute: a hierarchical latent structure setting process of setting a hierarchical latent structure that is a structure in which latent variables are represented by a tree structure and components representing probability models are located at nodes of a lowest level of the tree structure; a variational probability computation process of computing a variational probability of a path latent variable that is a latent variable included in a path linking a root node to a target node in the hierarchical latent structure; a component optimization process of optimizing each of the components for the computed variational probability; and a gating function optimization process of optimizing a gating function model that is a model for determining a branch direction according to the multivariate data in a node of the hierarchical latent structure, on the basis of the variational probability of the latent variable in the node.

According to the present invention, it is possible to solve the model selection problem for a hierarchical latent variable model including hierarchical latent variables, and also estimate the hierarchical latent variable model with appropriate computational complexity without losing theoretical justification.

DESCRIPTION OF THE PREFERRED EMBODIMENTS

Figure 1:
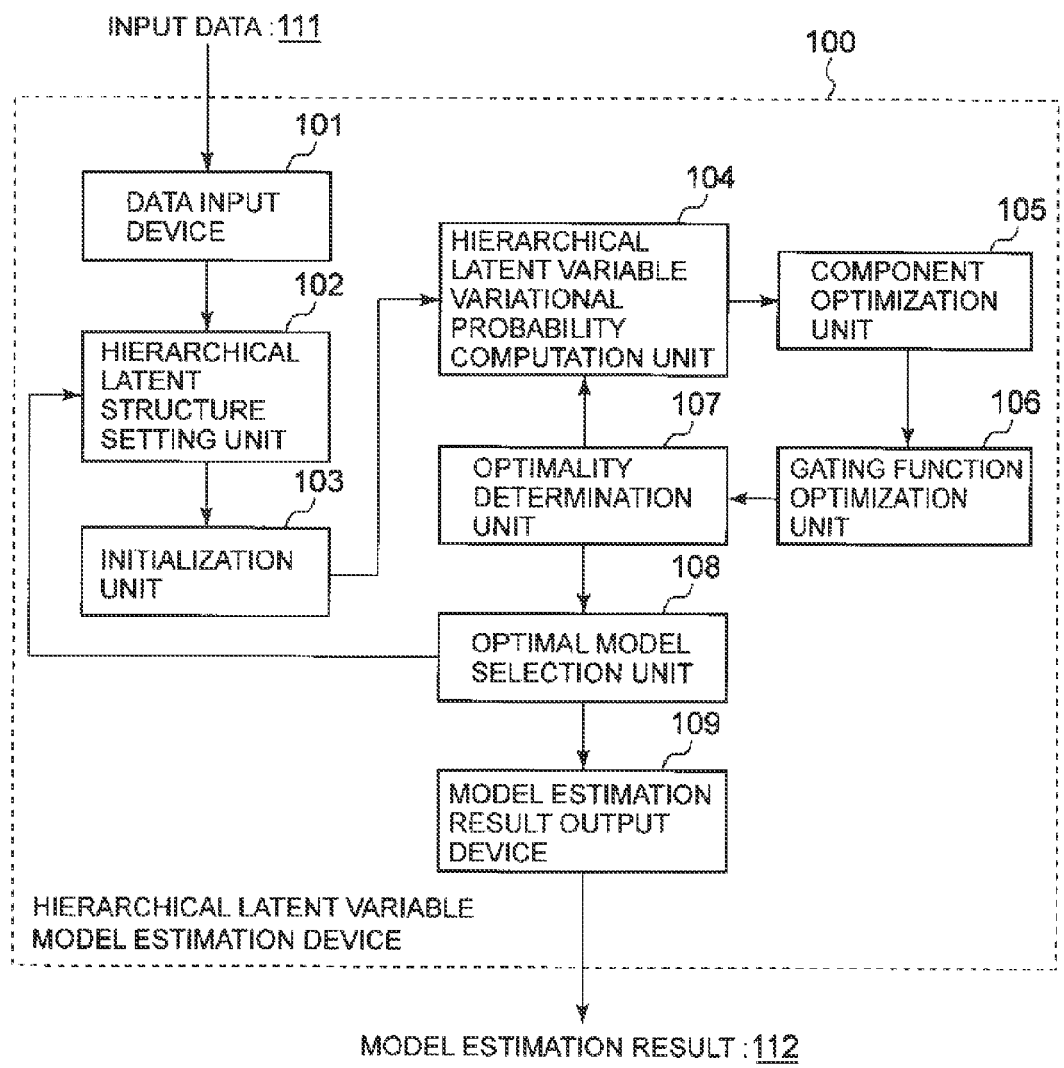
FIG. 1 is a block diagram showing a structure example of Exemplary Embodiment 1 of a hierarchical latent variable model estimation device according to the present invention.

In the present invention, a hierarchical latent variable model is a model in which latent variables (i.e. hierarchical structure) have a tree structure. Components which are probability models are located at lowest-level nodes of the tree structure. Each branch node is provided with a gating function for sorting branches according to input. In the following description, a hierarchical latent variable model of depth 2 in particular is described in detail.

Since the hierarchical structure is assumed to be the tree structure, a course from a root node to a given node is uniquely determined. Hereafter, the course (link) when linking the root node to the given node in the hierarchical latent structure is referred to as a path. By tracing a latent variable for each path, a path latent variable is determined. For example, a lowest-level path latent variable indicates a path latent variable determined for each path from the root node to a lowest-level node.

In the following description, it is assumed that a data sequence $x^n$ ($n=1, \ldots, N$) is input, where $x^n$ is an M-dimensional multivariate data sequence ($x^n = x_1^n, \ldots, x_M^n$). The data sequence $x^n$ is also referred to as an observed variable. A first-level branch latent variable $z_i^n$, a lowest-level branch latent variable and a lowest-level path latent variable $z_{j|i}^n$ for the observed variable $x^n$ are defined.

$z_i^n = 1$ indicates that $x^n$ input to the root node branches to the first-level i-th node, and $z_i^n = 0$ indicates that $x^n$ input to the root node does not branch to the first-level i-th node. $z_{j|i}^n = 1$ indicates that $x^n$ input to the first-level i-th node branches to the second-level j-th node, and $z_{j|i}^n=0$ indicates that $x^n$ input to the first-level i-th node does not branch to the second-level j-th node. $z_{ij}^n=1$ indicates that $x^n$ corresponds to the component traced by passing through the first-level i-th node and the second-level j-th node, and $z_{ij}^n=0$ indicates that $x^n$ does not correspond to the component traced by passing through the first-level i-th node and the second-level j-th node.

Since $\Sigma_i z_i^n=1$, $\Sigma_j z_{j|i}^n=1$, and $z_{ij}^n=z_i^n \cdot z_{j|i}^n$ are satisfied, $z_i^n=\Sigma_j z_{ij}^n$ holds true. The combination of x and z which is a representative value of the lowest-level path latent variable $z_{ij}^n$ is referred to as a "complete variable". In contrast, x is referred to as an "incomplete variable".

A hierarchical latent variable model joint distribution of depth 2 for the complete variable is represented by the following Expression 1.

$$p(x^N, z^N|M) = p(x^N, z_{1st}^N, z_{2nd}^N|M) \quad \text{(Expression 1)}$$

$$= \int \prod_{n=1}^{N} \left\{ p(z_{1st}^n|\beta) \prod_{i=1}^{K_1} p(z_{2nd|i}^n|\beta_i)^{z_i^n} \right. $$

$$\left. \prod_{i=1}^{K_1} \prod_{j=1}^{K_2} p(x^n|\phi_{ij})^{z_i^n \cdot z_{j|i}^n} \right\} d\theta.$$

That is, the hierarchical latent variable model joint distribution of depth 2 for the complete variable is defined by $P(x, y) = P(x, z_{1st}, z_{2nd})$ included in Expression 1 shown above. Here, a representative value of $z_i^n$ is denoted by $z_{1st}^n$, and a representative value of $z_{j|i}^n$ is denoted by $z_{2nd}^n$. Moreover, a variational distribution for the first-level branch latent variable $z_i^n$ is denoted by $q(z_i^n)$, and a variational distribution for the lowest-level path latent variable $z_{ij}^n$ is denoted by $q(z_{ij}^n)$.

In Expression 1 shown above, $K_1$ denotes the number of nodes of the first level, and $K_2$ denotes the number of nodes branched from each of the nodes of the first level. The components of the lowest level are represented by $K_1 \cdot K_2$. Meanwhile, $\theta=(\beta, \beta 1, \ldots, \beta K_1, \phi 1, \ldots, \phi K_1 \cdot K_2)$ denotes the parameter of the model. Here, $\beta$ is a branch parameter of the root node, $\beta k$ is a branch parameter of a first-level k-th node, and $\phi k$ is an observation parameter for a k-th component.

Furthermore, $S1, \ldots, SK_1 \cdot K_2$ represents the type of observation probability corresponding to $\phi k$. As an example, in the case of multivariate data generation probability, candidates that can be S1 to $SK_1 \cdot K_2$ are {normal distribution, lognormal distribution, exponential distribution} and the like. As another example, in the case of outputting a polynomial curve, candidates that can be S1 to $SK_1 \cdot K_2$ are {zero-degree curve, linear curve, quadratic curve, cubic curve} and the like.

In the following description, a hierarchical latent variable model of depth 2 is used as a specific example. Note, however, that the hierarchical latent variable model estimated according to the present invention is not limited to a hierarchical latent variable model of depth 2, and may be a hierarchical latent variable model of depth 1 or depth 3 or more. In these cases, too, Expression 1 shown above and Expressions 2 to 4 shown below can be derived as in the case of the hierarchical latent variable model of depth 2, and so the estimation device can be realized by the same structure.

Though the following describes a distribution in the case where a target variable is X, the present invention is equally applicable in the case where an observation distribution is a conditional model P(Y|X) (Y is a target random variable) as in regression or discrimination.

An essential difference between the estimation device according to the present invention and the estimation method for the mixture latent variable model described in NPL 5 is described below, before describing exemplary embodiments of the present invention.

In the method described in NPL 5, a typical mixture model in which a latent variable is an indicator of each component is assumed, and an optimization criterion is derived as in Expression 10 in NPL 5. However, as Fisher information matrices are given in the form of Expression 6 in NPL 5, it is assumed in the method described in NPL 5 that a probability distribution of the latent variable which is the indicator of each component depends only on a mixture ratio of the mixture model. Therefore, component switching according to input cannot be realized, and so this optimization criterion is inappropriate.

In order to solve the problem stated above, it is necessary to set hierarchical latent variables and perform computation using an appropriate optimization criterion, as described in the exemplary embodiments of the present invention. In the present invention, a multi-stage specific model for sorting branches at each branch node according to input is assumed as an appropriate optimization criterion.

The following describes the exemplary embodiments of the present invention with reference to drawings.

Exemplary Embodiment 1

FIG. 1 is a block diagram showing a structure example of Exemplary Embodiment 1 of a hierarchical latent variable model estimation device according to the present invention. A hierarchical latent variable model estimation device 100 in this exemplary embodiment includes a data input device 101, a hierarchical latent structure setting unit 102, an initialization unit 103, a hierarchical latent variable variational probability computation unit 104, a component optimization unit 105, a gating function optimization unit 106, an optimality determination unit 107, an optimal model selection unit 108, and a model estimation result output device 109.

The hierarchical latent variable model estimation device 100, upon input of input data 111, optimizes the hierarchical latent structure and the type of observation probability for the input data 111, and outputs the result of optimization as a model estimation result 112.

Figure 2:
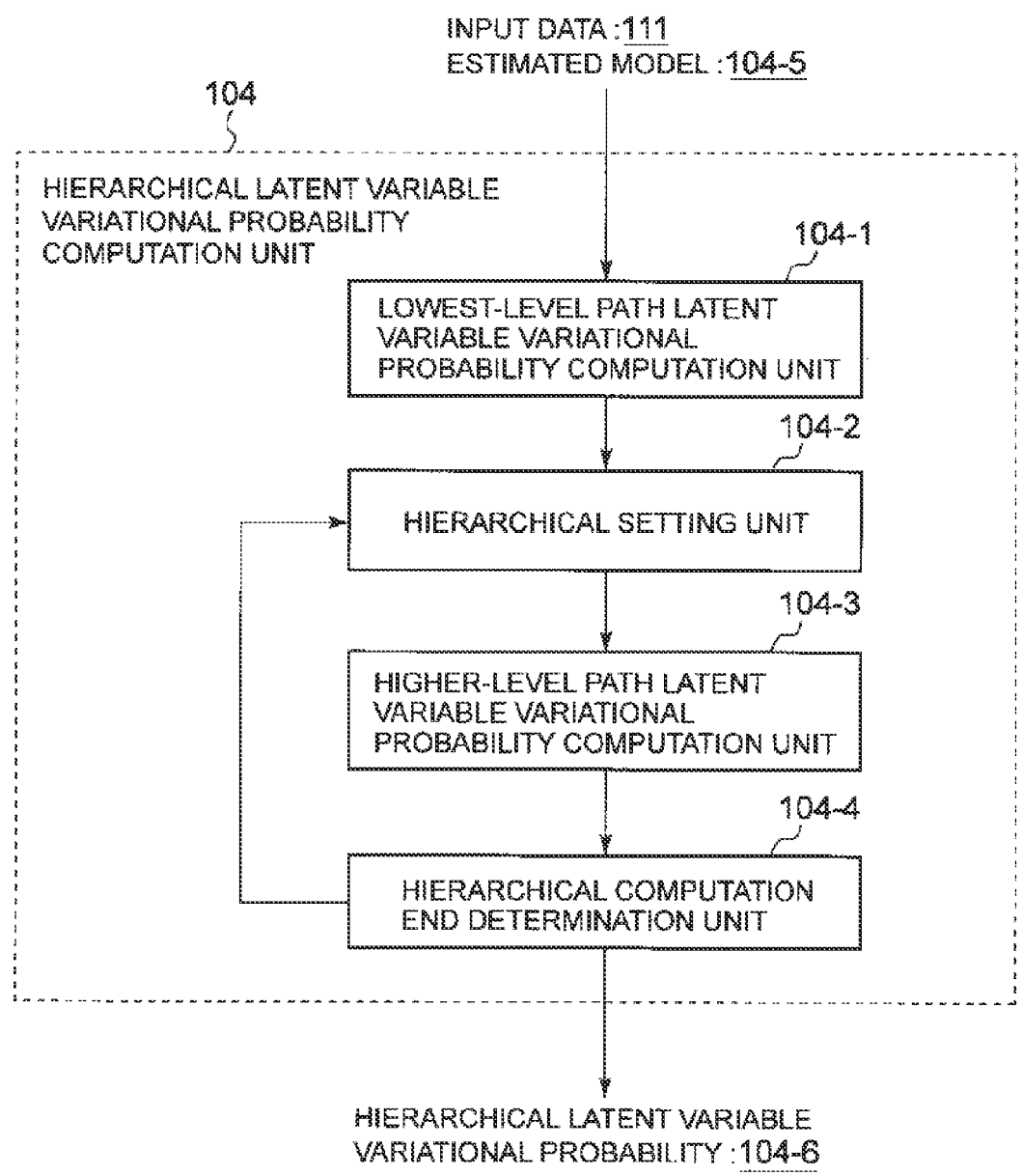
FIG. 2 is a block diagram showing a structure example of a hierarchical latent variable variational probability computation unit in Exemplary Embodiment 1.

FIG. 2 is a block diagram showing a structure example of the hierarchical latent variable variational probability computation unit 104 in Exemplary Embodiment 1. The hierarchical latent variable variational probability computation unit 104 includes a lowest-level path latent variable variational probability computation unit 104-1, a hierarchical setting unit 104-2, a higher-level path latent variable variational probability computation unit 104-3, and a hierarchical computation end determination unit 104-4.

The hierarchical latent variable variational probability computation unit 104 outputs a hierarchical latent variable variational probability 104-6, upon input of the input data 111 and a model 104-5 estimated by the below-mentioned component optimization unit 105. The hierarchical latent variable variational probability computation unit 104 will be described in detail later.

Figure 3:
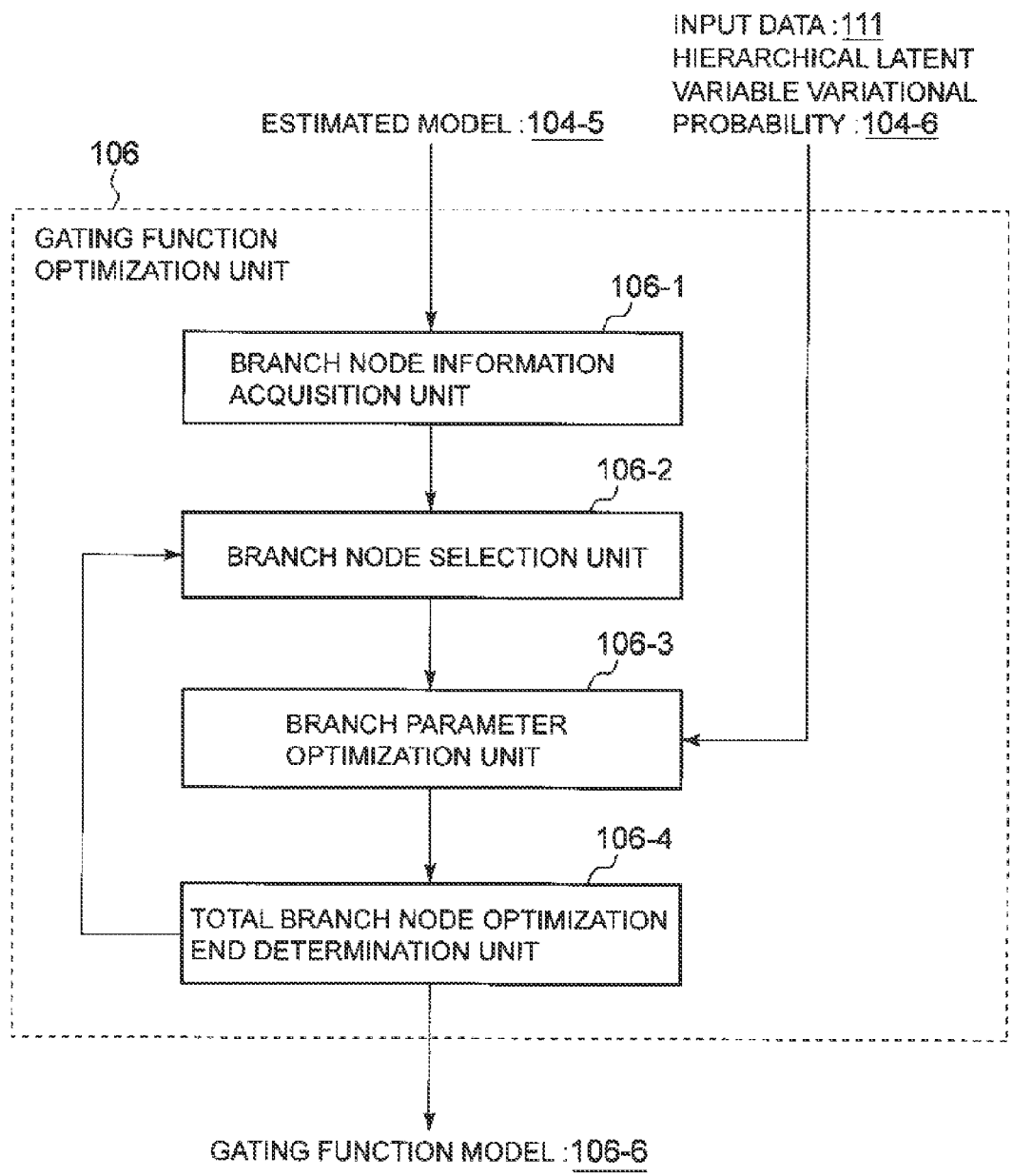
FIG. 3 is a block diagram showing a structure example of a gating function optimization unit in Exemplary Embodiment 1.

FIG. 3 is a block diagram showing a structure example of the gating function optimization unit 106 in Exemplary Embodiment 1. The gating function optimization unit 106 includes a branch node information acquisition unit 106-1, a branch node selection unit 106-2, a branch parameter optimization unit 106-3, and a total branch node optimization end determination unit 106-4.

The gating function optimization unit 106 outputs a gating function model 106-6, upon input of the input data 111, the hierarchical latent variable variational probability 104-6 computed by the below-mentioned hierarchical latent variable variational probability computation unit 104, and the model 104-5 estimated by the component optimization unit 105. The gating function optimization unit 106 will be described in detail later.

The data input device 101 is a device for inputting the input data 111. When inputting the input data 111, the data input device 101 simultaneously inputs parameters necessary for model estimation, such as candidates for the type of observation probability and the number of components.

The hierarchical latent structure setting unit 102 selects and sets a structure of a hierarchical latent variable model as an optimization candidate, from the input candidates for the type of observation probability and the number of components. The latent structure used in the present invention is a tree structure. Hereafter, the set number of components is denoted by C, and the mathematical expressions used in the description relate to a hierarchical latent variable model of depth 2. Note that the hierarchical latent structure setting unit 102 may store the selected hierarchical latent variable model structure in an internal memory.

For example, in the case of a binary tree model (model in which each branch node has two branches) of a tree structure of depth 2, the hierarchical latent structure setting unit 102 selects a hierarchical latent structure having two first-level nodes and four second-level nodes (lowest-level nodes in this exemplary embodiment).

The initialization unit 103 performs an initialization process for estimating the hierarchical latent variable model. The initialization unit 103 is capable of executing the initialization process by an arbitrary method. For example, the initialization unit 103 may randomly set the type of observation probability for each component, and randomly set a parameter of each observation probability according to the set type. Moreover, the initialization unit 103 may randomly set a lowest-level path variational probability of a hierarchical latent variable.

The hierarchical latent variable variational probability computation unit 104 computes a variational probability of a path latent variable for each level. Here, the parameter θ has been computed by the initialization unit 103 or by the component optimization unit 105 and the gating function optimization unit 106. Accordingly, the hierarchical latent variable variational probability computation unit 104 computes the variational probability using the parameter θ.

The hierarchical latent variable variational probability computation unit 104 computes the variational probability, by Laplace-approximating a marginal log-likelihood function with respect to an estimate (e.g. a maximum likelihood estimate or a maximum a posteriori probability estimate) for the complete variable and maximizing its lower bound. Such computed value is hereafter referred to as an optimization criterion A.

In detail, the maximization criterion A is a value that can be computed when parameters of lowest-level path latent variables and components are given. A procedure of computing the optimization criterion A is described below, using a hierarchical latent variable model of depth 2 as an example. A marginal log-likelihood is given by the following Expression 2.

$$\log p(x^N|M) \geq \sum_{z^N} q(z^N) \log\left\{\frac{p(x^N, z^N|M)}{q(z^N)}\right\}. \quad \text{(Expression 2)}$$

First, consider the lower bound of the marginal log-likelihood given by Expression 2 shown above. In Expression 2, the equality holds true when the lowest-level path latent variable variational probability $q(z^N)$ is maximized. Laplace-approximating the marginal likelihood of the complete variable in the numerator using the maximum likelihood estimate for the complete variable yields an approximation of the marginal log-likelihood function represented by the following Expression 3.

$$\mathcal{J}(q, \bar{\theta}, x^N) = \sum_{z^N} q(z^N) \left\{ \log p(x^N, z^N|\bar{\theta}) - \frac{D_\beta}{2}\log N - \right.$$

$$\sum_{i=1}^{K_1} \frac{D_{\beta i}}{2} \log\left(\sum_{n=1}^{N}\sum_{j=1}^{K_2} z_{ij}^n\right) -$$

$$\left. \sum_{i=1}^{K_1}\sum_{j=1}^{K_2} \frac{D_{\phi ij}}{2} \log\left(\sum_{n=1}^{N} z_{ij}^n\right) - \log q(z^N) \right\}. \quad \text{(Expression 3)}$$

In Expression 3, the superscript bar indicates the maximum likelihood estimate for the complete variable, and $D_*$ indicates the dimensionality of the subscript parameter *.

Next, by use of the property of the maximum likelihood estimate to maximize the log-likelihood function and the fact that the logarithm function is a concave function, the lower bound of Expression 3 is computed according to the following Expression 4. The value computed according to Expression 4 exemplified below corresponds to the optimization criterion A.

$$\mathcal{G}(q, q', q'', \theta, x^N) = \sum_{z^N} q(z^N)\left[\log p(x^N, z^N|\bar{\theta}) - \frac{D_\beta}{2}\log N - \right. \quad \text{(Expression 4)}$$

$$\sum_{i=1}^{K_1} \frac{D_{\beta i}}{2} \left\{\log\left(\sum_{n=1}^{N} q'(z_i^n)\right) + \frac{\sum_{n=1}^{N}\sum_{j=1}^{K_2} z_{ij}^n}{\sum_{n=1}^{N} q'(z_i^n)} - 1\right\} -$$

-continued $$\sum_{i=1}^{K_1}\sum_{j=1}^{K_2}\frac{D_{\phi ij}}{2}\left\{\log\left(\sum_{n=1}^{N}q''(z_{ij}^n)\right)+\frac{\sum_{n=1}^{N}z_{ij}^n}{\sum_{n=1}^{N}q''(z_{ij}^n)}-1\right\}-$$

$$\log q(z^N)\bigg].$$

A variational distribution q' of the first-level branch latent variable and a variational distribution q" of the lowest-level path latent variable are each obtained by maximizing Expression 4 for the variational distribution. Here, q" and θ are fixed so that q"=q$^{(t-1)}$ and θ=θ$^{(t-1)}$, and q' is fixed at the value represented by the following Expression A.

$$q'=\Sigma_{j=1}^{K2}q^{(t-1)} \quad \text{(Expression A).}$$

Here, the superscript (t) indicates the t-th iteration in iterative computation of the hierarchical latent variable variational probability computation unit 104, the component optimization unit 105, the gating function optimization unit 106, and the optimality determination unit 107.

The following describes the operation of the hierarchical latent variable variational probability computation unit 104 with reference to FIG. 2. The lowest-level path latent variable variational probability computation unit 104-1 receives input of the input data 111 and the estimated model 104-5, and computes the lowest-level latent variable variational probability $q(z^N)$. The hierarchical setting unit 104-2 sets the lowest level as the variational probability computation target.

The higher-level path latent variable variational probability computation unit 104-3 computes the path latent variable variational probability of the immediately higher level. In detail, the higher-level path latent variable variational probability computation unit 104-3 computes the sum of latent variable variational probabilities of the current level having the same branch node as the parent, and sets the sum as the path latent variable variational probability of the immediately higher level.

The hierarchical computation end determination unit 104-4 determines whether or not there is any higher level for which the variational probability is to be computed. In the case where the hierarchical computation end determination unit 104-4 determines that there is the higher level, the hierarchical setting unit 104-2 sets the immediately higher level as the variational probability computation target. Subsequently, the higher-level path latent variable variational probability computation unit 104-3 and the hierarchical computation end determination unit 104-4 repeat the above-mentioned process. In the case where the hierarchical computation end determination unit 104-4 determines that there is no higher level, the hierarchical computation end determination unit 104-4 determines that the path latent variable variational probability has been computed for all levels.

The component optimization unit 105 optimizes the model (parameter θ and type S) of each component for Expression 4 shown above, and outputs the optimized model 104-5. In the case of a hierarchical latent variable model of depth 2, the component optimization unit 105 fixes q and q" at the lowest-level path latent variable variational probability $q^{(t)}$ computed by the hierarchical latent variable variational probability computation unit 104, and fixes q' at the higher-level path latent variable variational probability represented by Expression A shown above. The component optimization unit 105 then computes a model for maximizing the value of G in Expression 4.

G defined by Expression 4 can decompose the optimization function for each component. Accordingly, S1 to $SK_1 \cdot K_2$ and parameters φ1 to $φK_1 \cdot K_2$ can be separately optimized without taking into account the component type combination (e.g. which type of S1 to $SK_1 \cdot K_2$ is designated). The capability of optimizing in such a way is important in this process. Thus, the type of component can be optimized while avoiding combination explosion.

The following describes the operation of the gating function optimization unit 106 with reference to FIG. 3. The branch node information acquisition unit 106-1 extracts a branch node list using the model 104-5 estimated by the component optimization unit 105. The branch node selection unit 106-2 selects one branch node from the extracted branch node list. Hereafter, the selected node is also referred to as a selection node.

The branch parameter optimization unit 106-3 optimizes the branch parameter of the selection node, using the input data 111 and the latent variable variational probability for the selection node obtained from the hierarchical latent variable variational probability 104-6. The branch parameter of the selection node corresponds to the above-mentioned gating function.

The total branch node optimization end determination unit 106-4 determines whether or not all branch nodes extracted by the branch node information acquisition unit 106-1 have been optimized. In the case where all branch nodes have been optimized, the gating function optimization unit 106 ends the process. In the case where all branch nodes have not been optimized, the branch node selection unit 106-2 performs its process, and then the branch parameter optimization unit 106-3 and the total branch node optimization end determination unit 106-4 perform their respective processes.

A specific example of the gating function is described below, using a gating function based on a Bernoulli distribution for a binary tree hierarchical model. Hereafter, the gating function based on the Bernoulli distribution is also referred to as a Bernoulli gating function. Let $x_d$ be the d-th dimension of x, g$^-$ be a probability of branching to the lower left of the binary tree when this value does not exceed a threshold w, and g$^+$ be a probability of branching to the lower left of the binary tree when this value exceeds the threshold w. The branch parameter optimization unit 106-3 optimizes the above-mentioned optimization parameters d, w, g$^-$, and g$^+$, based on the Bernoulli distribution. In this case, each parameter has an analytical solution unlike the one based on a logit function described in NPL 1, which contributes to faster optimization.

The optimality determination unit 107 determines whether or not the optimization criterion A computed using Expression 4 shown above has converged. In the case where the optimization criterion A has not converged, the processes by the hierarchical latent variable variational probability computation unit 104, the component optimization unit 105, the gating function optimization unit 106, and the optimality determination unit 107 are repeated. For example, the optimality determination unit 107 may determine that the optimization criterion A has converged in the case where an increment of the optimization criterion A is less than a predetermined threshold.

Hereafter, the processes by the hierarchical latent variable variational probability computation unit 104, the component optimization unit 105, the gating function optimization unit 106, and the optimality determination unit 107 are also collectively referred to as the processes by the hierarchical latent variable variational probability computation unit 104 to the optimality determination unit 107. The processes by the hierarchical latent variable variational probability computation unit 104 to the optimality determination unit 107 are repeatedly performed to update the variational distribution and the model, as a result of which an appropriate model can be selected. Note that repeatedly performing these processes ensures that the optimization criterion A increases monotonically.

The optimal model selection unit 108 selects an optimal model. In detail, in the case where the optimization criterion A computed as a result of the processes by the hierarchical latent variable variational probability computation unit 104 to the optimality determination unit 107 is greater than the currently set optimization criterion A for the number C of hidden states set by the hierarchical latent structure setting unit 102, the optimal model selection unit 108 selects the model as the optimal model.

The model estimation result output device 109 outputs the optimal number of hidden states, type of observation probability, parameter, variational distribution, and the like as the model estimation result output result 112, in the case where model optimization has been completed for the candidate of the hierarchical latent model structure set from the input candidates for the type of observation probability and the number of components. In the case where there is any candidate for which optimization has not been completed, on the other hand, the procedure goes to the process by the hierarchical latent structure setting unit 102, and the same processes as described above are performed.

The hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108 are realized by a CPU of a computer operating according to a program (hierarchical latent variable model estimation program).

For example, the program may be stored in a storage unit (not shown) in the hierarchical latent variable model estimation device 100, with the CPU reading the program and, according to the program, operating as the hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108.

Alternatively, the hierarchical latent structure setting unit 102, the initialization unit 103, the hierarchical latent variable variational probability computation unit 104, the component optimization unit 105, the gating function optimization unit 106, the optimality determination unit 107, and the optimal model selection unit 108 may each be realized by dedicated hardware.

Figure 4:
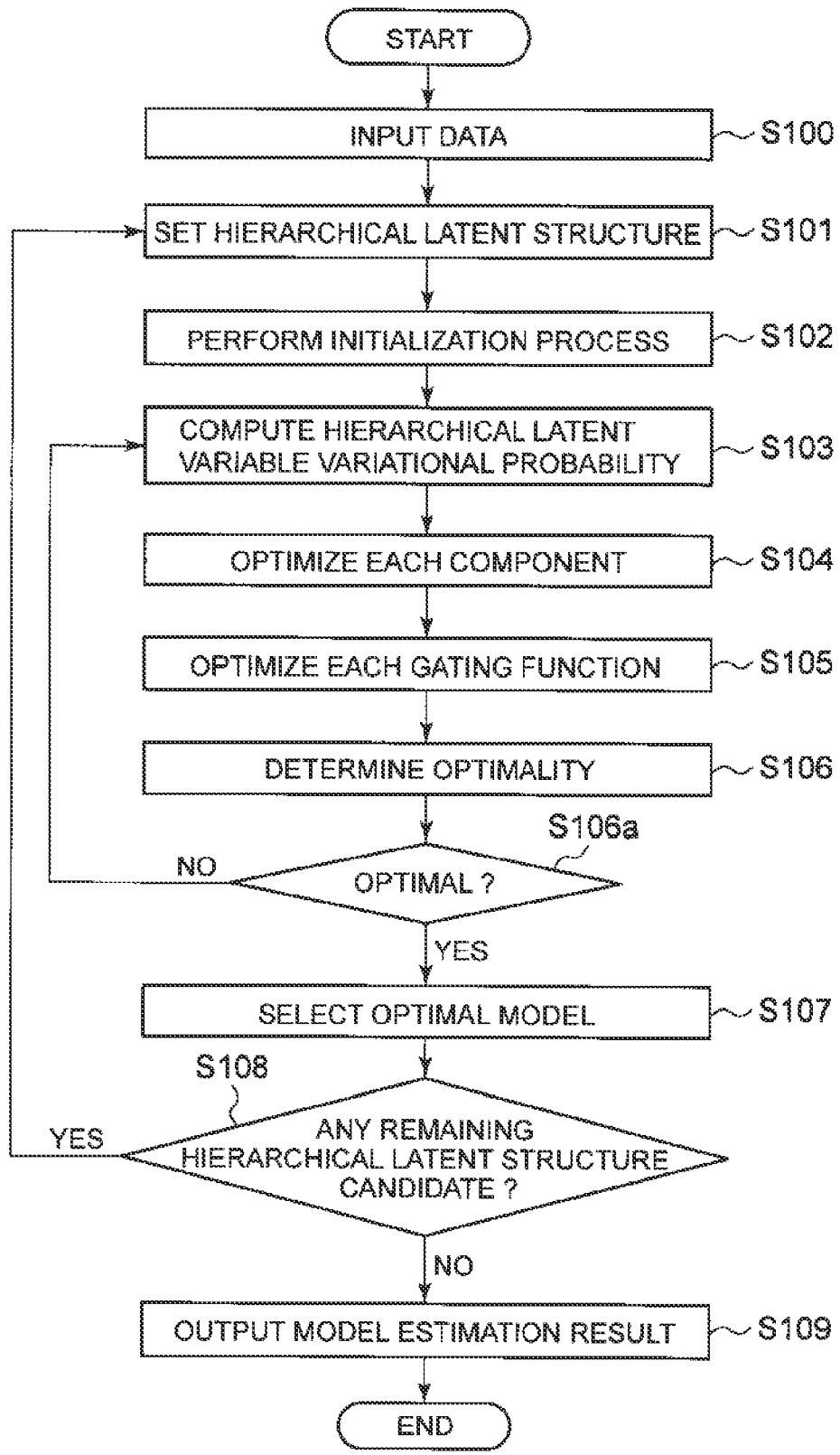
FIG. 4 is a flowchart showing an operation example of the hierarchical latent variable model estimation device in Exemplary Embodiment 1.

The following describes the operation of the hierarchical latent variable model estimation device in this exemplary embodiment. FIG. 4 is a flowchart showing an operation example of the hierarchical latent variable model estimation device in this exemplary embodiment.

First, the data input device 101 inputs the input data 111 (step S100). Next, the hierarchical latent structure setting unit 102 selects and sets a hierarchical latent structure which has not been optimized, from the input hierarchical latent structure candidate values (step S101). Next, the initialization unit 103 performs the initialization process of the latent variable variational probability and the parameter used for estimation, for the set hierarchical latent structure (step S102).

Next, the hierarchical latent variable variational probability computation unit 104 computes the variational probability of each path latent variable (step S103). Next, the component optimization unit 105 optimizes each component by estimating the type of observation probability and the parameter (step S104).

Next, the gating function optimization unit 106 optimizes the branch parameter in each branch node (step S105). Next, the optimality determination unit 107 determines whether or not the optimization criterion A has converged (step S106). That is, the optimality determination unit 107 determines the optimality of the model.

In the case where, in step S106, it is not determined that the optimization criterion A has converged, i.e. it is determined that the model is not optimal (step S106a: No), the processes of steps S103 to S106 are repeated.

In the case where, in step S106, it is determined that the optimization criterion A has converged, i.e. it is determined that the model is optimal (step S106a: Yes), on the other hand, the optimal model selection unit 108 compares the value of the optimization criterion A according to the currently set optimal model (e.g. the number of components, the type of observation probability, the parameter) with the value of the optimization criterion A according to the model optimized in this process, and selects the model with the greater value as the optimal model (step S107).

Next, the optimal model selection unit 108 determines whether or not any hierarchical latent structure candidate which has not been estimated remains (step S108). In the case where the candidate remains (step S108: Yes), the processes of steps S101 to S108 are repeated. In the case where no candidate remains (step S108: No), on the other hand, the model estimation result output device 109 outputs the model estimation result, and ends the process (step S109).

Figure 5:
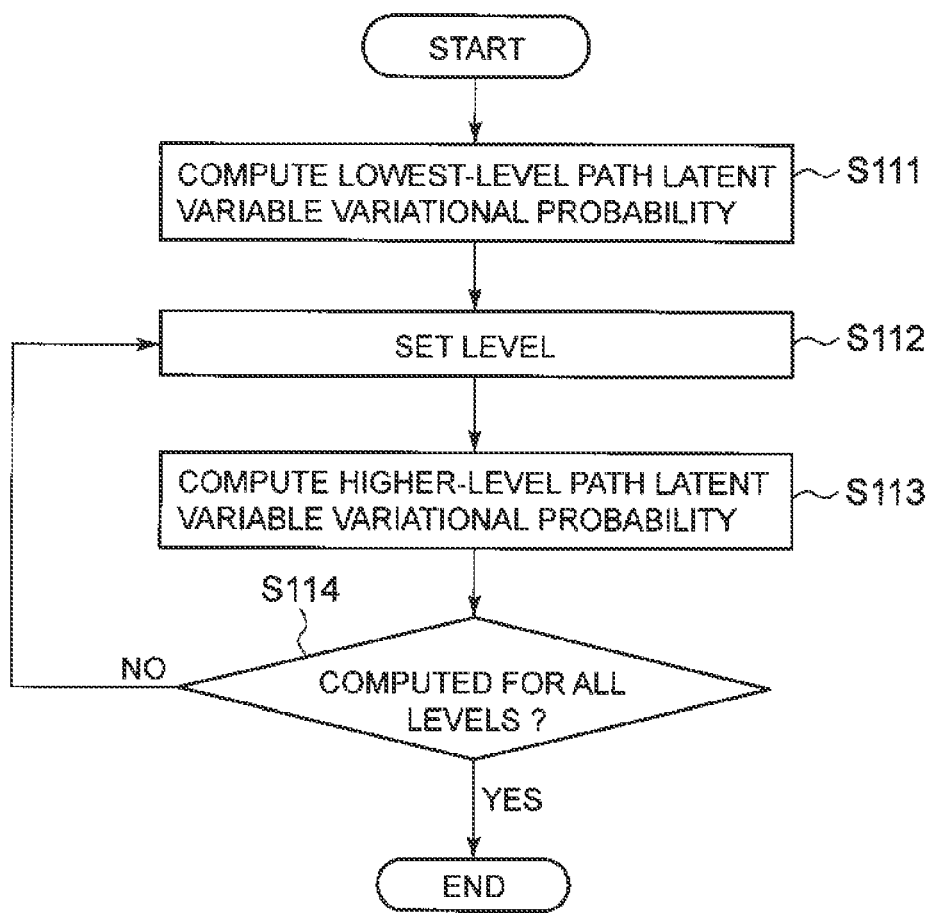
FIG. 5 is a flowchart showing an operation example of the hierarchical latent variable variational probability computation unit in Exemplary Embodiment 1.

The following describes the operation of the hierarchical latent variable variational probability computation unit 104 in this exemplary embodiment. FIG. 5 is a flowchart showing an operation example of the hierarchical latent variable variational probability computation unit 104 in this exemplary embodiment.

First, the lowest-level path latent variable variational probability computation unit 104-1 computes the lowest-level path latent variable variational probability (step S111). Next, the hierarchical setting unit 104-2 sets to which level the path latent variable has been computed (step S112). Next, the higher-level path latent variable variational probability computation unit 104-3 computes the path latent variable variational probability of the immediately higher level, using the path latent variable variational probabilities of the level set by the hierarchical setting unit 104-2 (step S113).

Next, the hierarchical computation end determination unit 104-4 determines whether or not any level for which the path latent variable has not been computed remains (step S114). In the case where the level for which the path latent variable has not been computed remains (step S114: No), the processes of steps S112 to S113 are repeated. In the case where no level for which the path latent variable has not been computed remains, on the other hand, the hierarchical latent variable variational probability computation unit 104 ends the process.

Figure 6:
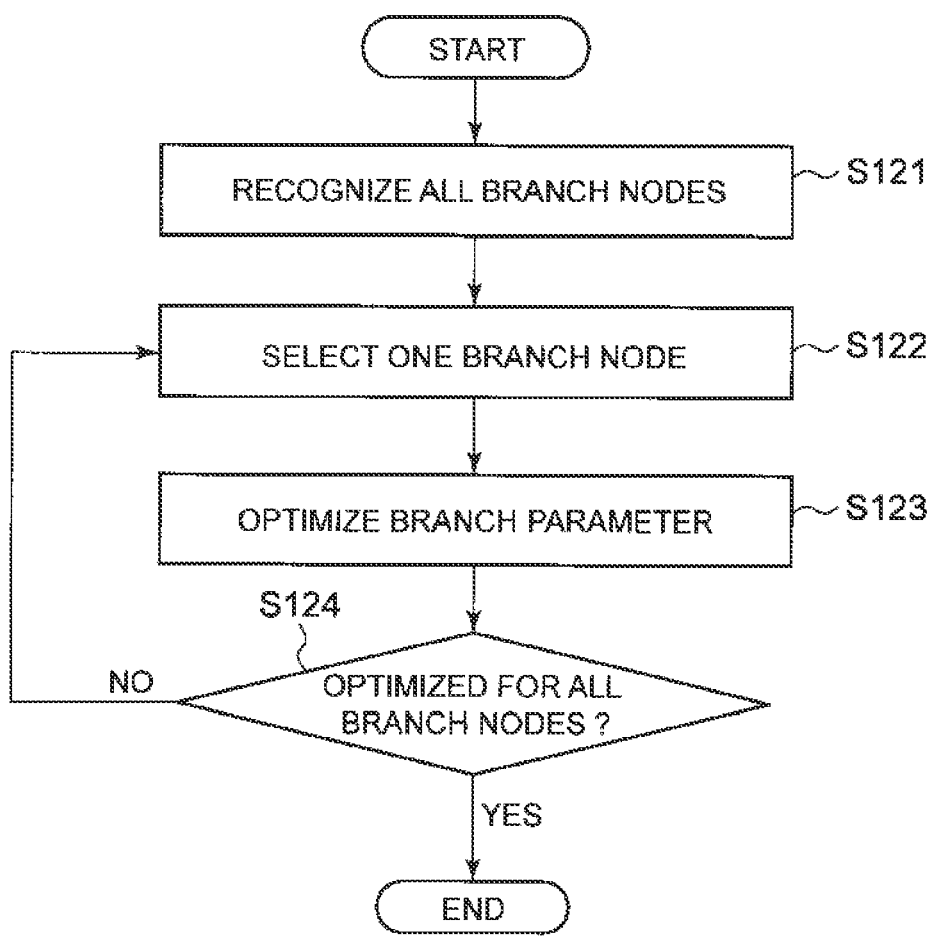
FIG. 6 is a flowchart showing an operation example of the gating function optimization unit in Exemplary Embodiment 1.

The following describes the operation of the gating function optimization unit 106 in this exemplary embodiment. FIG. 6 is a flowchart showing an operation example of the gating function optimization unit 106 in this exemplary embodiment.

First, the branch node information acquisition unit 106-1 recognizes all branch nodes (step S121). Next, the branch node selection unit 106-2 selects one branch node as the optimization target (step S122). Next, the branch parameter optimization unit 106-3 optimizes the branch parameter in the selected branch node (step S123).

Next, the total branch node optimization end determination unit 106-4 determines whether or not any branch node which has not been optimized remains (step S124). In the case where the branch node which has not been optimized remains, the processes of steps S122 to S123 are repeated. In the case where no branch node which has not been optimized remains, on the other hand, the gating function optimization unit 106 ends the process.

As described above, according to this exemplary embodiment, the hierarchical latent structure setting unit 102 sets the hierarchical latent structure. Here, the hierarchical latent structure is a structure in which latent variables are represented by a tree structure, with components representing probability models being located at lowest-level nodes of the tree structure.

The hierarchical latent variable variational probability computation unit 104 computes the variational probability of the path latent variable. The hierarchical latent variable variational probability computation unit 104 may compute the variational probability of the latent variable for each level of the tree structure, from the lowest-level node in sequence. For example, the hierarchical latent variable variational probability computation unit 104 may compute the lowest-level path latent variable variational probability for maximizing the optimization criterion A on the basis of the given parameter, and further compute, on a level-by-level basis in sequence, the higher-level path latent variable variational probability using the expression for computing the variational probability sum (e.g. $q(z_i^n) = \Sigma_j q(z_{ij}^n)$).

Following this, the component optimization unit 105 optimizes the component for the computed variational probability, and the gating function optimization unit 106 optimizes the gating function model on the basis of the variational probability of the latent variable in the node of the hierarchical latent structure. Note that the gating function model is a model for determining the branch direction according to the multivariate data in the node of the hierarchical latent structure.

Since the hierarchical latent variable model for the multivariate data is estimated by the structure described above, the hierarchical latent variable model including hierarchical latent variables can be estimated with appropriate computational complexity without losing theoretical justification, and also the model selection problem for the hierarchical latent variable model can be solved.

Here, the hierarchical latent structure setting unit 102 may set the hierarchical latent structure in which the latent variables are represented by a binary tree structure, where the gating function optimization unit 106 optimizes the gating function model based on a Bernoulli distribution, on the basis of the variational probability of the latent variable in the node. In this case, each parameter has an analytical solution, which contributes to faster optimization.

Exemplary Embodiment 2

Figure 7:
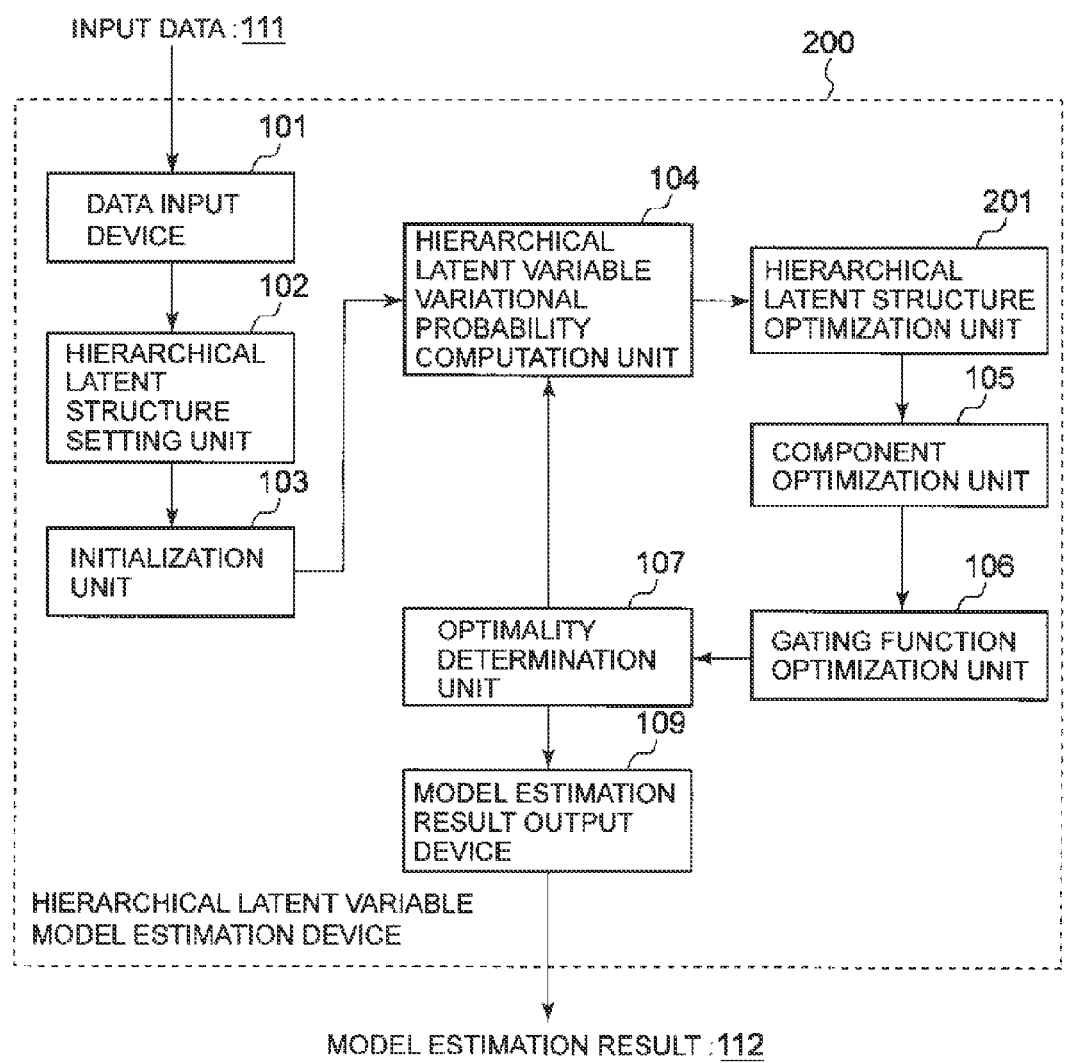
FIG. 7 is a block diagram showing a structure example of Exemplary Embodiment 2 of a hierarchical latent variable model estimation device according to the present invention.

FIG. 7 is a block diagram showing a structure example of Exemplary Embodiment 2 of a hierarchical latent variable model estimation device according to the present invention. The same structures as those in Exemplary Embodiment 1 are given the same reference signs as in FIG. 1, and their description is omitted. A hierarchical latent variable model estimation device 200 in this exemplary embodiment differs from the hierarchical latent variable model estimation device 100 only in that a hierarchical latent structure optimization unit 201 is connected and the optimal model selection unit 108 is not connected.

In Exemplary Embodiment 1, the hierarchical latent variable model estimation device 100 optimizes the model of gating functions and components for the hierarchical latent structure candidate, and selects the hierarchical latent structure for optimizing the optimization criterion A. In the hierarchical latent variable model estimation device 200 in this exemplary embodiment, on the other hand, a process whereby the hierarchical latent structure optimization unit 201 removes a path having a reduced latent variable from the model is added after the process by the hierarchical latent variable variational probability computation unit 104.

Figure 8:
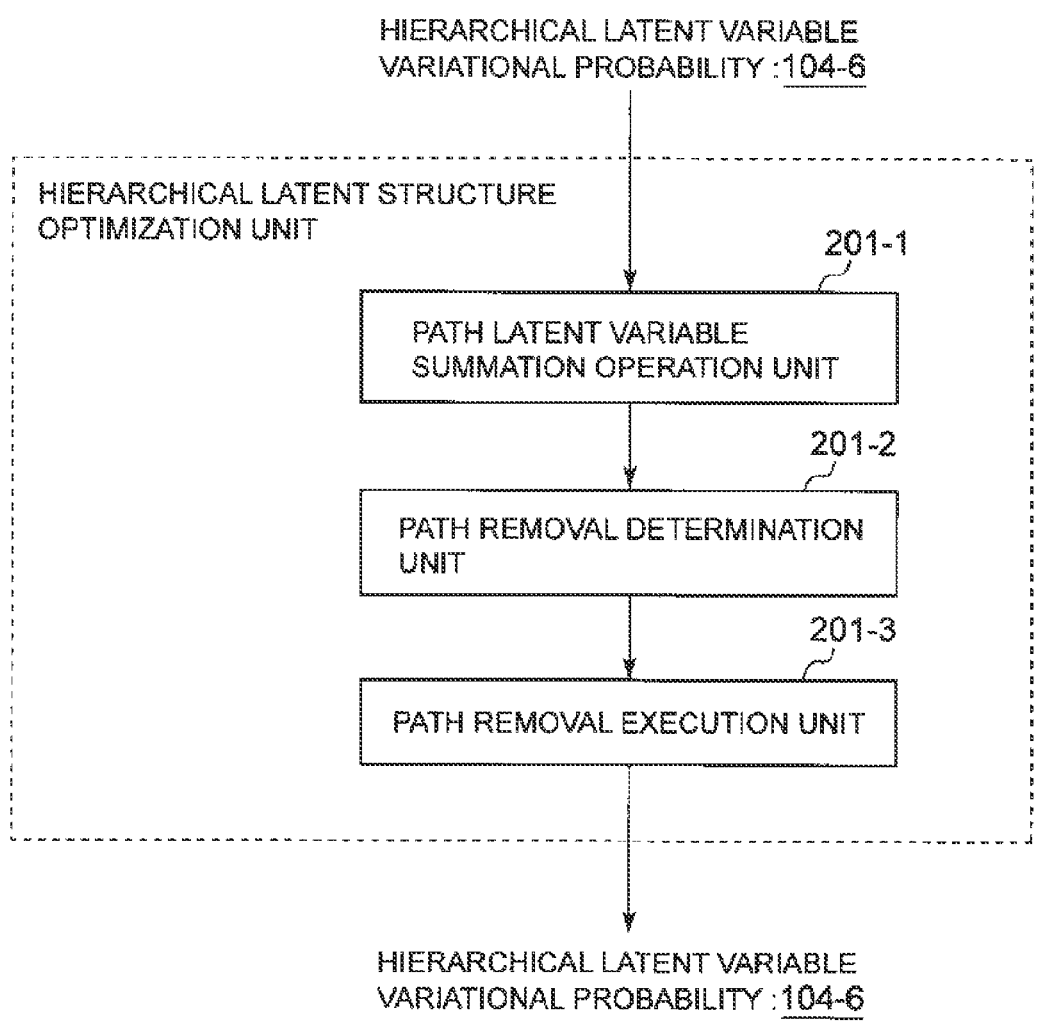
FIG. 8 is a block diagram showing a structure example of a hierarchical latent structure optimization unit in Exemplary Embodiment 2.

FIG. 8 is a block diagram showing a structure example of the hierarchical latent structure optimization unit 201 in Exemplary Embodiment 2. The hierarchical latent structure optimization unit 201 includes a path latent variable summation operation unit 201-1, a path removal determination unit 201-2, and a path removal execution unit 201-3.

The path latent variable summation operation unit 201-1 receives input of the hierarchical latent variable variational probability 104-6, and computes the sum (hereafter referred to as "sample sum") of lowest-level path latent variable variational probabilities in each component.

The path removal determination unit 201-2 determines whether or not the sample sum is equal to or less than a predetermined threshold $\epsilon$. Here, $\epsilon$ is a threshold input together with the input data 111. In detail, the condition determined by the path removal determination unit 201-2 can be represented by, for example, the following Expression 5.

$$\sum_{n=1}^{N} q(z_{ij}^n) \leq \epsilon. \quad \text{(Expression 5)}$$

That is, the path removal determination unit 201-2 determines whether or not the lowest-level path latent variable variational probability $q(z_{ij}^n)$ in each component satisfies the criterion defined by Expression 5 shown above. In other words, the path removal determination unit 201-2 determines whether or not the sample sum is sufficiently small.

The path removal execution unit 201-3 sets the variational probability of the path for which the sample sum is determined to be sufficiently small, to 0. The path removal execution unit 201-3 then re-computes the hierarchical latent variable variational probability 104-6 for each level using the lowest-level path latent variable variational probability normalized for each remaining path (i.e. path whose variational probability is not set to 0), and outputs the re-computation result.

The validity of this process is described below. Expression 6 shown below as an example is an update expression of $q(z_{ij}^n)$ in iterative optimization.

$$q^t(z_{ij}^n) \propto g_i^n g_{j|i}^n p(x^n|\phi_{ij}) \exp\left\{\frac{-D_{\beta_i}}{2\sum_{n=1}^{N}\sum_{j=1}^{K_2} q^{t-1}(z_{ij}^n)} + \frac{-D_{\phi_{ij}}}{2\sum_{n=1}^{N} q^{t-1}(z_{ij}^n)}\right\}. \quad \text{(Expression 6)}$$

In Expression 6 shown above, the negative term is included in the exponent part, and $q(z_{ij}^n)$ computed in the preceding process is present in the denominator of the term. Accordingly, the value of optimized $q(z_{ij}^n)$ is smaller when the denominator is smaller. Thus, a small path latent variable variational probability is gradually reduced through iterative computation.

Note that the hierarchical latent structure optimization unit 201 (more specifically, the path latent variable summation operation unit 201-1, the path removal determination unit 201-2, and the path removal execution unit 201-3) is realized by a CPU of a computer operating according to a program (hierarchical latent variable model estimation program).

Figure 9:
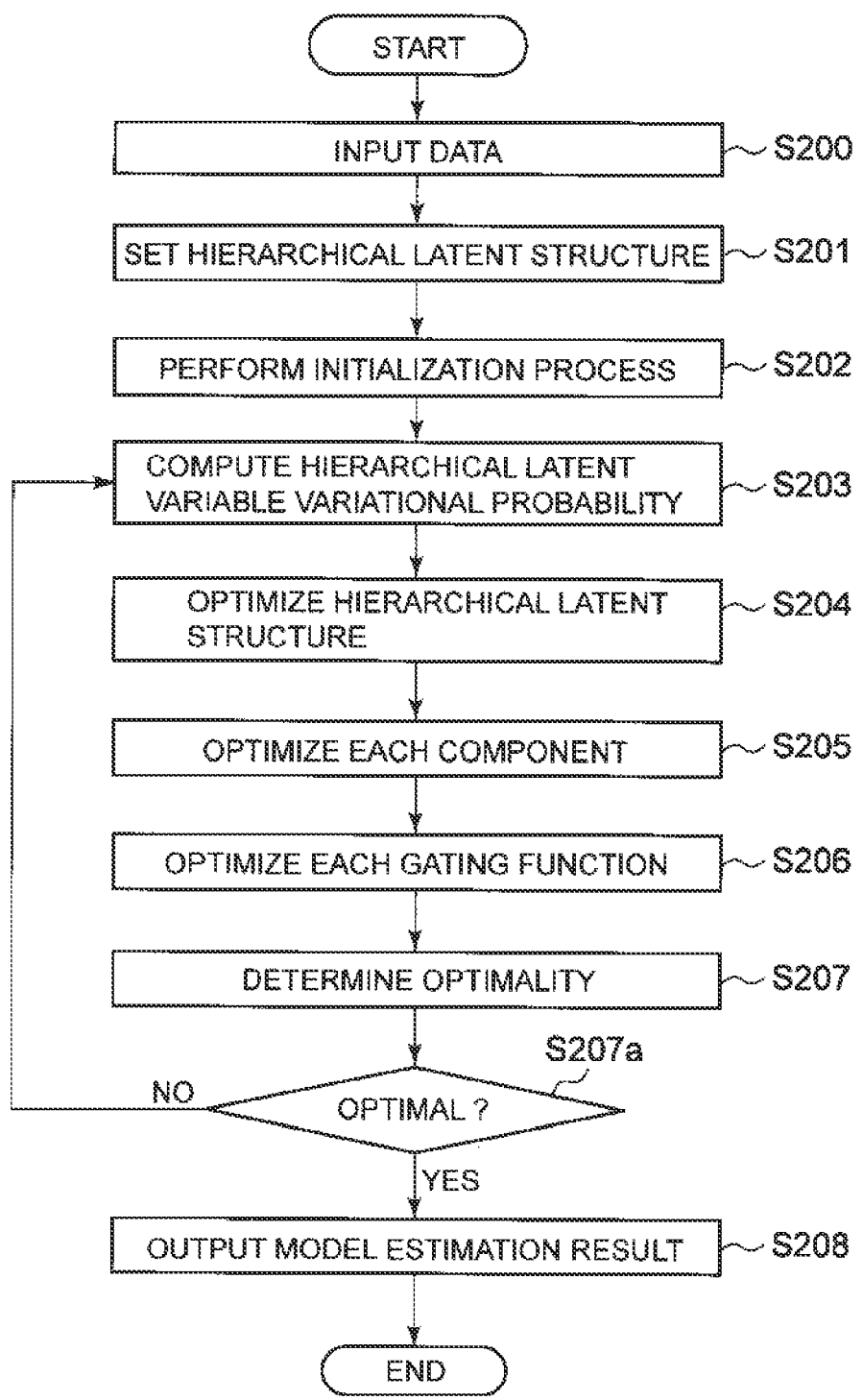
FIG. 9 is a flowchart showing an operation example of the hierarchical latent variable model estimation device in Exemplary Embodiment 2.

The following describes the operation of the hierarchical latent variable model estimation device 200 in this exemplary embodiment. FIG. 9 is a flowchart showing an operation example of the hierarchical latent variable model estimation device 200 in this exemplary embodiment.

First, the data input device 101 inputs the input data 111 (step S200). Next, the hierarchical latent structure setting unit 102 sets an initial state of the number of hidden states as the hierarchical latent structure (step S201).

In Exemplary Embodiment 1, the plurality of candidates are all executed for the number of components to search for the optimal solution. In this exemplary embodiment, on the other hand, the number of components can be optimized, too, so that the hierarchical latent structure can be optimized in one operation. Therefore, in step S201, only the initial value of the number of hidden states needs to be set once, unlike step S102 in Exemplary Embodiment 1 where the candidate which has not been optimized is selected from the plurality of candidates.

Next, the initialization unit 103 performs the initialization process of the latent variable variational probability and the parameter used for estimation, for the set hierarchical latent structure (step S202).

Next, the hierarchical latent variable variational probability computation unit 104 computes the variational probability of each path latent variable (step S203). Next, the hierarchical latent structure optimization unit 201 optimizes the hierarchical latent structure by estimating the number of components (step S204). That is, since the components are located at the lowest-level nodes, when optimizing the hierarchical latent structure, the number of components is optimized, too.

Next, the component optimization unit 105 optimizes each component by estimating the type of observation probability and the parameter (step S205). Next, the gating function optimization unit 106 optimizes the branch parameter in each branch node (step S206). Next, the optimality determination unit 107 determines whether or not the optimization criterion A has converged (step S207). That is, the optimality determination unit 107 determines the optimality of the model.

In the case where, in step S207, it is not determined that the optimization criterion A has converged, i.e. it is determined that the model is not optimal (step S207a: No), the processes of steps S203 to S207 are repeated.

In the case where, in step S207, it is determined that the optimization criterion A has converged, i.e. it is determined that the model is optimal (step S207a: Yes), on the other hand, the model estimation result output device 109 outputs the model estimation result, and ends the process (step S208).

Figure 10:
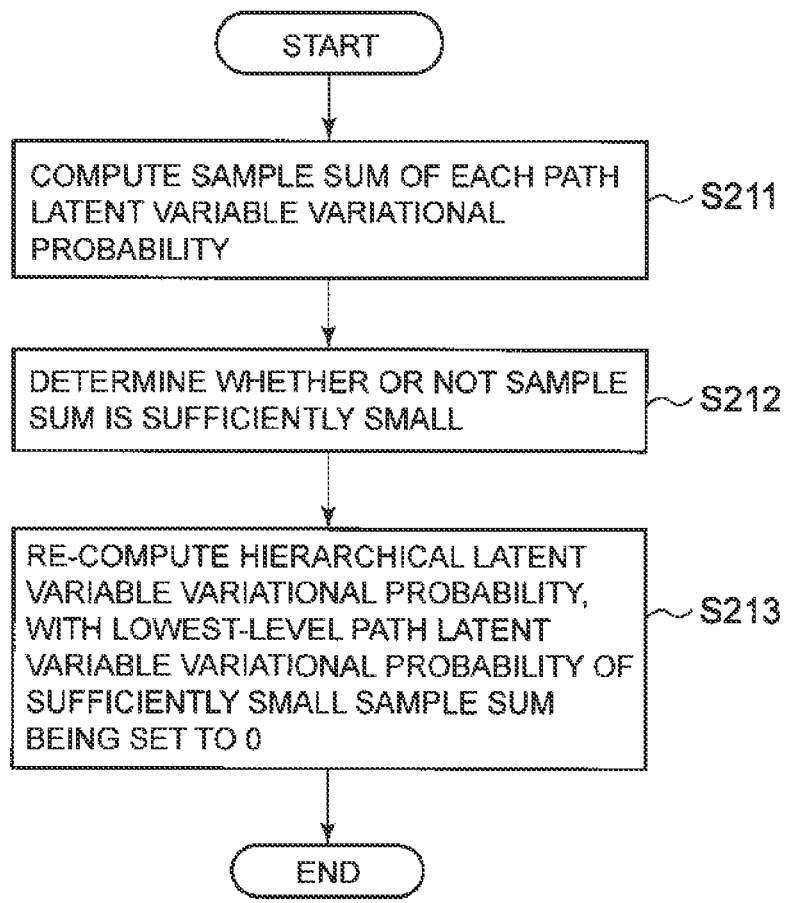
FIG. 10 is a flowchart showing an operation example of the hierarchical latent structure optimization unit in Exemplary Embodiment 2.

The following describes the operation of the hierarchical latent structure optimization unit 201 in this exemplary embodiment. FIG. 10 is a flowchart showing an operation example of the hierarchical latent structure optimization unit 201 in this exemplary embodiment.

First, the path latent variable summation operation unit 201-1 computes the sample sum of path latent variables (step S211). Next, the path removal determination unit 201-2 determines whether or not the computed sample sum is sufficiently small (step S212). Next, the path removal execution unit 201-3 outputs the hierarchical latent variable variational probability re-computed in a state where the lowest-level path latent variable variational probability for which the sample sum is determined to be sufficiently small is set to 0, and ends the process (step S213).

As described above, in this exemplary embodiment, the hierarchical latent structure optimization unit 201 optimizes the hierarchical latent structure by removing, from the model, the path whose computed variational probability is equal to or less than the predetermined threshold.

According to such a structure, in addition to the advantageous effects of Exemplary Embodiment 1, the number of components can be optimized in one operation, with there being no need to optimize the plurality of hierarchical latent structure candidates as in the hierarchical latent variable model estimation device 100. This enables the number of components, the type and parameter of observation probability, and the variational distribution to be estimated simultaneously, so that computation costs can be reduced.

Exemplary Embodiment 3

The following describes Exemplary Embodiment 3 of a hierarchical latent variable model estimation device according to the present invention. The hierarchical latent variable model estimation device in this exemplary embodiment differs from the hierarchical latent variable model estimation device 200 only in that the gating function optimization unit 106 is replaced by a gating function optimization unit 113.

Figure 11:
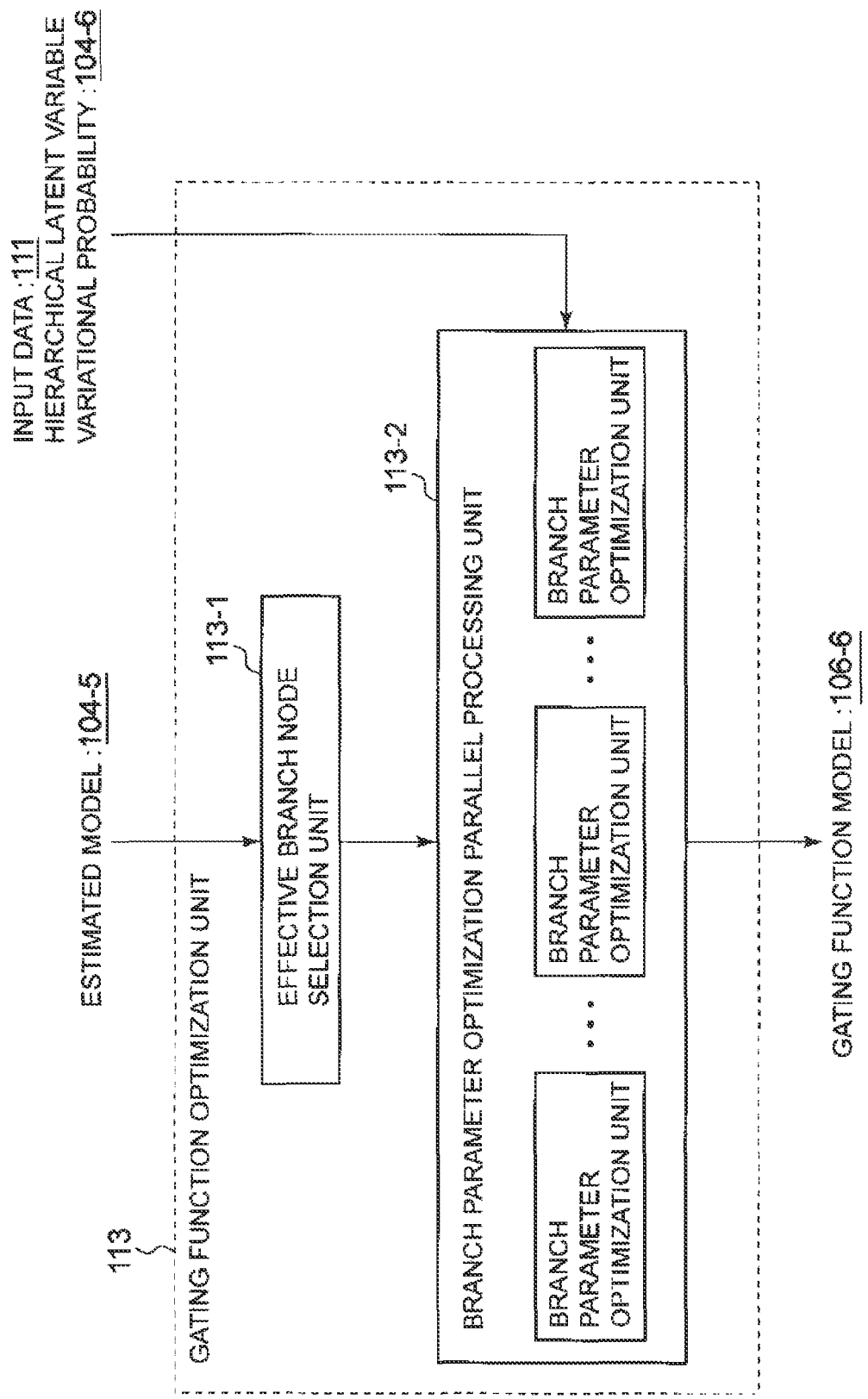
FIG. 11 is a block diagram showing a structure example of a gating function optimization unit in Exemplary Embodiment 3.

FIG. 11 is a block diagram showing a structure example of the gating function optimization unit 113 in Exemplary Embodiment 3. The gating function optimization unit 113 includes an effective branch node selection unit 113-1 and a branch parameter optimization parallel processing unit 113-2.

The effective branch node selection unit 113-1 selects only effective branch nodes from the hierarchical latent structure. In detail, through the use of the model 104-5 estimated by the component optimization unit 105, the effective branch node selection unit 113-1 selects only the effective branch nodes by taking into account the path removed from the model. Thus, an effective branch node means a branch node on a path not removed from the hierarchical latent structure.

The branch parameter optimization parallel processing unit 113-2 performs the branch parameter optimization process for the effective branch nodes in parallel, and outputs the gating function model 106-6. In detail, the branch parameter optimization parallel processing unit 113-2 optimizes the branch parameters for all effective branch nodes simultaneously in parallel, using the input data 111 and the hierarchical latent variable variational probability 104-6 computed by the hierarchical latent variable variational probability computation unit 104.

For instance, the branch parameter optimization parallel processing unit 113-2 may include the branch parameter optimization units 106-3 in Exemplary Embodiment 1 arranged in parallel, as exemplified in FIG. 11. Such a structure allows the branch parameters of all gating functions to be optimized at one time.

That is, while the hierarchical latent variable model estimation devices 100 and 200 execute the optimization process of the gating functions one at a time, the hierarchical latent variable model estimation device in this exemplary embodiment can execute the optimization process of the gating functions in parallel, which contributes to faster model estimation.

Note that the gating function optimization unit 113 (more specifically, the effective branch node selection unit 113-1 and the branch parameter optimization parallel processing unit 113-2) is realized by a CPU of a computer operating according to a program (hierarchical latent variable model estimation program).

Figure 12:
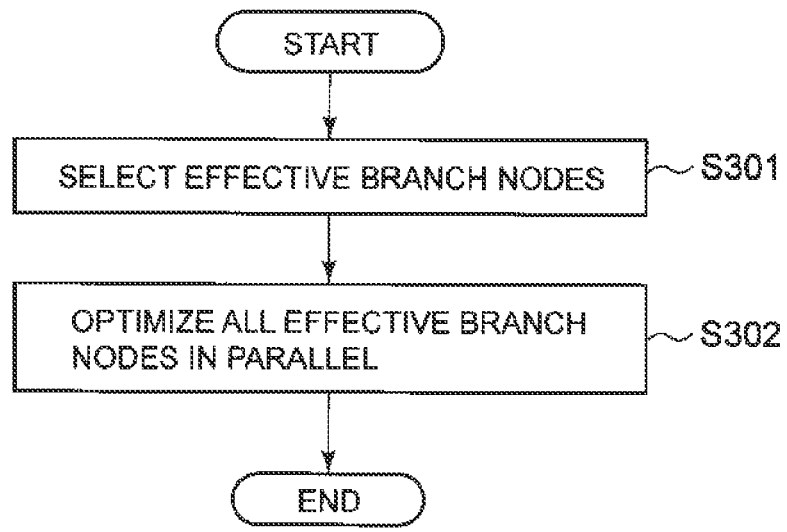
FIG. 12 is a flowchart showing an operation example of the gating function optimization unit in Exemplary Embodiment 3.

The following describes the operation of the gating function optimization unit 113 in this exemplary embodiment. FIG. 12 is a flowchart showing an operation example of the gating function optimization unit 113 in this exemplary embodiment. First, the effective branch node selection unit 113-1 selects all effective branch nodes (step S301). Next, the branch parameter optimization parallel processing unit 113-2 optimizes all effective branch nodes in parallel, and ends the process (step S302).

As described above, according to this exemplary embodiment, the effective branch node selection unit 113-1 selects the effective branch nodes from the hierarchical latent structure nodes, and the branch parameter optimization parallel processing unit 113-2 optimizes the gating function model on the basis of the variational probability of the latent variable in each effective branch node. Here, the branch parameter optimization parallel processing unit 113-2 optimizes the branch parameters for the effective branch nodes in parallel. Thus, the optimization process of the gating functions can be performed in parallel, so that faster model estimation can be achieved in addition to the advantageous effects of the foregoing exemplary embodiments.

Note that each program (hierarchical latent variable model estimation program) described above is stored in a computer-readable recording medium, and causes a computer to execute the processes by the above-mentioned units.

The following describes the present invention using specific examples. Note, however, that the scope of the present invention is not limited to the following, and the variable model estimation device according to the present invention is applicable to various models.

A specific example of the hierarchical latent variable model estimation device in Exemplary Embodiment 1 is described first. An example of applying the hierarchical latent variable model estimation device in Exemplary Embodiment 1 to a situation of analyzing electricity demand history of a building is used here.

By applying the hierarchical latent variable model estimation device in Exemplary Embodiment 1, for example it is possible to decompose the relations between power consumption and multivariate data acquired from a plurality of sensors installed in the building, for each of a plurality of different circumstances such as "weekdays and weekends". Moreover, by applying the hierarchical latent variable model estimation device in Exemplary Embodiment 1, for example it is possible to estimate a rule of switching between the acquired plurality of relations, such as switching their relation to a specific relation in the case of "a given temperature or higher".

For power consumption prediction used for resolving excess or shortage of electricity supply, it is extremely important to not only estimate the plurality of relations but also estimate how to switch between the plurality of relations.

For example, consider a hierarchical latent variable model in which an assumed polynomial regression expression having air temperature, time of day, and day of week as explanatory variables and power consumption after one hour as a response variable is applied to each component. A model to be estimated here is a hierarchical latent structure, a regression parameter ($\phi k$), and a lowest-level path latent variable variational distribution (q).

First, the data input device 101 inputs a plurality of different tree structures as hierarchical latent structure candidates to the hierarchical latent variable model estimation device, together with the data of the explanatory variables and the response variable. The hierarchical latent structure setting unit 102 sets the input tree structures in sequence. Next, the initialization unit 103 randomly sets a regression degree and other parameters for the set hierarchical latent structure, as the initialization process. The model is then estimated through the processes by the hierarchical latent variable variational probability computation unit 104 to the optimality determination unit 107.

By these processes, a plurality of regression models representing different circumstances and their switching rule can be obtained automatically. Examples of the plurality of regression models representing the different circumstances include a regression model having a large regression coefficient of an explanatory variable indicating about 9 o'clock which is the time to arrive at the office, and a regression model having a relatively small regression coefficient of a parameter indicating the time of day.

Furthermore, the optimal model selection unit 108 automatically selects which hierarchical latent structure is optimal. Hence, it is possible to, for example, automatically detect the number of different power consumption patterns according to the building and model the relations of the appropriate number of patterns and their switching rule.

A specific example of the hierarchical latent variable model estimation device in Exemplary Embodiment 2 is described next. An example of applying the hierarchical latent variable model estimation device in Exemplary Embodiment 2 to a situation of analyzing purchase information of a mass retailer is used here.

For example, by analyzing POS system information and information of weather, neighborhood events, and the like by comparison, it is possible to determine stockout or inventory deficiency and obtain marketing knowledge of when products sell well. Consider a binary tree hierarchical latent variable model in which an assumed polynomial regression expression having weather, time of day, and day of week as explanatory variables and sales of each product as a response variable is applied to each component.

First, the data input device 101 inputs a depth Dmax of the hierarchical latent structure and the threshold ϵ for path selection to the hierarchical latent variable model estimation device, together with the data of the explanatory variables and the response variable. The hierarchical latent structure setting unit 102 sets the hierarchical latent structure candidate as a binary tree of depth Dmax. The initialization unit 103 randomly initializes other parameters. The model is then estimated through the processes by the hierarchical latent variable variational probability computation unit 104 to the optimality determination unit 107.

By these processes, patterns of selling well when the temperature is low or when the temperature is high, patterns of selling well in the morning or in the afternoon, and patterns of selling well in the beginning of week or in weekends can be separated. Moreover, the path latent variable corresponding to any untypical pattern is reduced, and so this path is removed by the hierarchical latent structure optimization unit 201. It is therefore possible to extract only typical patterns as the final estimation result.

Figure 13:
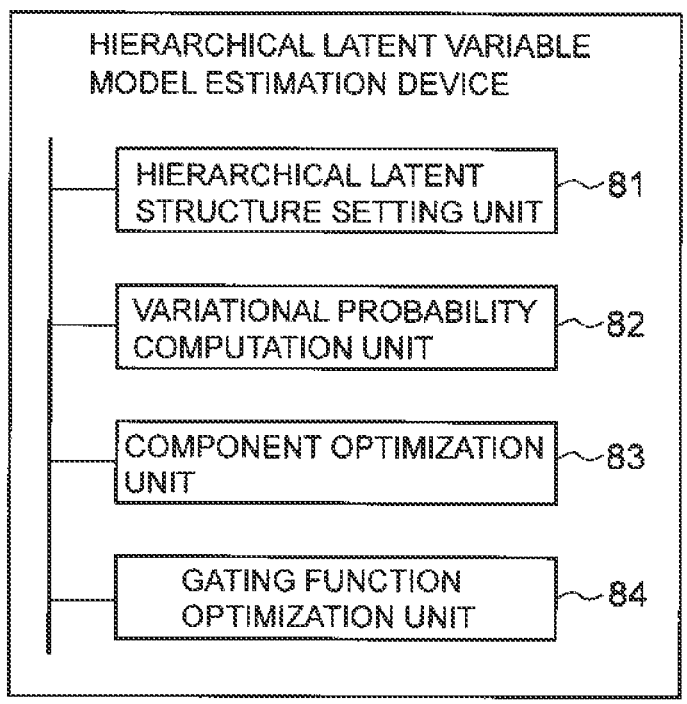
FIG. 13 is a block diagram schematically showing a hierarchical latent variable model estimation device according to the present invention.

The following describes an overview of the present invention. FIG. 13 is a block diagram schematically showing a hierarchical latent variable model estimation device according to the present invention. The hierarchical latent variable model estimation device according to the present invention is a hierarchical latent variable model estimation device for estimating a hierarchical latent variable model for multivariate data, and includes: a hierarchical latent structure setting unit 81 (e.g. the hierarchical latent structure setting unit 102) for setting a hierarchical latent structure that is a structure in which latent variables are represented by a tree structure and components representing probability models are located at nodes of a lowest level of the tree structure; a variational probability computation unit 82 (e.g. the hierarchical latent variable variational probability computation unit 104) for computing a variational probability of a path latent variable that is a latent variable included in a path linking a root node to a target node in the hierarchical latent structure; a component optimization unit 83 (e.g. the component optimization unit 105) for optimizing each of the components for the computed variational probability; and a gating function optimization unit 84 (e.g. the gating function optimization unit 106) for optimizing a gating function model that is a model for determining a branch direction according to the multivariate data in a node of the hierarchical latent structure, on the basis of the variational probability of the latent variable in the node.

According to such a structure, the model selection problem for a hierarchical latent variable model including hierarchical latent variables can be solved, and also the hierarchical latent variable model can be estimated with appropriate computational complexity without losing theoretical justification.

Moreover, the hierarchical latent variable model estimation device may include a hierarchical latent structure optimization unit (e.g. the hierarchical latent structure optimization unit 201) for optimizing the hierarchical latent structure by removing, from the model, a path whose computed variational probability is equal to or less than a predetermined threshold. According to such a structure, the number of components can be optimized in one operation, with there being no need to optimize a plurality of hierarchical latent structure candidates.

Moreover, the gating function optimization unit 84 may include: an effective branch node selection unit (e.g. the effective branch node selection unit 113-1) for selecting an effective branch node from nodes of the hierarchical latent structure, the effective branch node being a branch node of a path not removed from the hierarchical latent structure; and a gating function optimization parallel processing unit (e.g. the branch parameter optimization parallel processing unit 113-2) for optimizing the gating function model on the basis of the variational probability of the latent variable in the effective branch node. The gating function optimization parallel processing unit may perform optimization of each branch parameter for the effective branch node in parallel. According to such a structure, faster model estimation can be achieved.

Moreover, the hierarchical latent structure setting unit 81 may set the hierarchical latent structure in which the latent variables are represented by a binary tree structure. The gating function optimization unit 84 may then optimize the gating function model based on a Bernoulli distribution, on the basis of the variational probability of the latent variable in the node. In this case, each parameter has an analytical solution, which contributes to faster optimization.

In detail, the variational probability computation unit 82 may compute the variational probability of the path latent variable of the lowest level so as to maximize an optimization criterion (e.g. the optimization criterion A) computed on the basis of the path latent variable of the lowest level and a parameter of a component, and compute a sum (e.g. $q(z_i'')$ $=\Sigma_j q(z_{ij}'')$) of computed variational probabilities of path latent variables of the level as the variational probability of the path latent variable of a higher level, on a level-by-level basis.

CITATION LIST

Non Patent Literature

NPL 1: C. Bishop, M. Svensén, Bayesian Hierarchical Mixtures of Experts, Proceedings of the Nineteenth Conference on Uncertainty in Artificial Intelligence, p. 57-64, 2002.

NPL 2: C. Bishop, Pattern Recognition and Machine Learning, Springer, p. 423-459, 2007.

NPL 3: Beal, M. J., Variational Algorithms for Approximate Bayesian Inference, PhD thesis, University College London, May 2003.

NPL 4: Van Gael, J., Saatci, Y., Teh, Y. W., and Ghahramani, Z., Beam Sampling for the Infinite Hidden Markov Model, In ICML, 2008.

NPL 5: Ryohei Fujimaki, Satoshi Morinaga, Factorized Asymptotic Bayesian Inference for Mixture Modeling, Proceedings of the Fifteenth International Conference on Artificial Intelligence and Statistics (AISTATS), March 2012.

What is claimed is:

1. A hierarchical latent variable model estimation apparatus for estimating a hierarchical latent variable model for multivariate data, the hierarchical latent variable model estimation apparatus comprising:

a hierarchical latent structure setting unit for setting a hierarchical latent structure that is a structure in which latent variables are represented by a tree structure and components representing probability models are located at nodes of a lowest level of the tree structure;

a variational probability computation unit for computing a variational probability of a path latent variable that is a latent variable included in a path linking a root node to a target node in the hierarchical latent structure;

a component optimization unit for optimizing each of the components for the computed variational probability; and a gating function optimization unit for optimizing a gating function model that is a model for determining a branch direction according to the multivariate data in a node of the hierarchical latent structure, on the basis of the variational probability of the latent variable in the node.

2. The hierarchical latent variable model estimation device according to claim 1, comprising a hierarchical latent structure optimization unit for optimizing the hierarchical latent structure by removing, from the model, a path whose computed variational probability is equal to or less than a predetermined threshold.

3. The hierarchical latent variable model estimation device according to claim 2, wherein the gating function optimization unit includes:

an effective branch node selection unit for selecting an effective branch node from nodes of the hierarchical latent structure, the effective branch node being a branch node of a path not removed from the hierarchical latent structure; and a gating function optimization parallel processing unit for optimizing the gating function model on the basis of the variational probability of the latent variable in the effective branch node, and wherein the gating function optimization parallel processing unit performs optimization of each branch parameter for the effective branch node in parallel.

4. The hierarchical latent variable model estimation device according to claim 1, wherein the hierarchical latent structure setting unit sets the hierarchical latent structure in which the latent variables are represented by a binary tree structure, and wherein the gating function optimization unit optimizes the gating function model based on a Bernoulli distribution, on the basis of the variational probability of the latent variable in the node.

5. The hierarchical latent variable model estimation device according to claim 1, wherein the variational probability computation unit computes the variational probability of the path latent variable of the lowest level so as to maximize an optimization criterion computed on the basis of the path latent variable of the lowest level and a parameter of a component, and computes a sum of computed variational probabilities of path latent variables of the level as the variational probability of the path latent variable of a higher level, on a level-by-level basis.

6. A computer implemented hierarchical latent variable model estimation method for estimating a hierarchical latent variable model for multivariate data, the hierarchical latent variable model estimation method comprising:

setting a hierarchical latent structure that is a structure in which latent variables are represented by a tree structure and components representing probability models are located at nodes of a lowest level of the tree structure;

computing a variational probability of a path latent variable that is a latent variable included in a path linking a root node to a target node in the hierarchical latent structure;

optimizing each of the components for the computed variational probability; and optimizing a gating function model that is a model for determining a branch direction according to the multivariate data in a node of the hierarchical latent structure, on the basis of the variational probability of the latent variable in the node.

7. The hierarchical latent variable model estimation method according to claim 6, comprising optimizing the hierarchical latent structure by removing, from the model, a path whose computed variational probability is equal to or less than a predetermined threshold.

8. A non-transitory computer-readable recording medium having recorded thereon a hierarchical latent variable model estimation program for estimating a hierarchical latent variable model for multivariate data, the hierarchical latent variable model estimation program causing a computer to execute:

a hierarchical latent structure setting process of setting a hierarchical latent structure that is a structure in which latent variables are represented by a tree structure and components representing probability models are located at nodes of a lowest level of the tree structure;

a variational probability computation process of computing a variational probability of a path latent variable that is a latent variable included in a path linking a root node to a target node in the hierarchical latent structure;

a component optimization process of optimizing each of the components for the computed variational probability; and a gating function optimization process of optimizing a gating function model that is a model for determining a branch direction according to the multivariate data in a node of the hierarchical latent structure, on the basis of the variational probability of the latent variable in the node.

9. The non-transitory recording medium according to claim 8, wherein the hierarchical latent variable model estimation program causes the computer to execute a hierarchical latent structure optimization process of optimizing the hierarchical latent structure by removing, from the model, a path whose computed variational probability is equal to or less than a predetermined threshold.

* * * * *

UNITED STATES PATENT AND TRADEMARK OFFICE
CERTIFICATE OF CORRECTION

PATENT NO. : 8,909,582 B2
APPLICATION NO. : 13/758267
DATED : December 9, 2014
INVENTOR(S) : Riki Eto, Ryohei Fujimaki and Satoshi Morinaga It is certified that error appears in the above-identified patent and that said Letters Patent is hereby corrected as shown below:

In the Specification

Column 4, Line 63: After "variable" insert -- $Z_{jli}^{n}$, --

In the Claims

Column 21, Line 9: In Claim 2, delete "device" and insert -- apparatus --

Column 21, Line 17: In Claim 3, delete "device" and insert -- apparatus --

Column 21, Line 32: In Claim 4, delete "device" and insert -- apparatus --

Column 21, Line 39: In Claim 5, delete "device" and insert -- apparatus --

Column 22, Line 14: In Claim 7, after "The" insert -- computer implemented --

Signed and Sealed this
Eighth Day of September, 2015

Michelle K. Lee
*Director of the United States Patent and Trademark Office*